United States Patent [19]
Gleason et al.

[11] Patent Number: 6,127,642
[45] Date of Patent: Oct. 3, 2000

[54] FLEX RESTRAINED ELECTRICAL DISCHARGE MACHINING

[75] Inventors: Mark J. Gleason, Madisonville; William J. Scott, Clay, both of Ky.

[73] Assignee: General Electric Company, Cincinnati, Ohio

[21] Appl. No.: 09/150,691

[22] Filed: Sep. 10, 1998

[51] Int. Cl.⁷ .............................. B23H 1/00; B23H 7/26
[52] U.S. Cl. ...................................... 219/69.15; 219/69.2
[58] Field of Search .............................. 219/69.11, 69.2, 219/69.15, 69.14

[56] References Cited

U.S. PATENT DOCUMENTS

| | | | |
|---|---|---|---|
| 4,705,932 | 11/1987 | Aso et al. | 219/69.2 |
| 4,804,814 | 2/1989 | Southerland et al. | 219/69.14 |
| 5,019,683 | 5/1991 | Abdukarimor et al. | 219/69.16 |

FOREIGN PATENT DOCUMENTS

| | | | |
|---|---|---|---|
| 1-164526 | 6/1989 | Japan | 219/69.2 |
| 1-295723 | 11/1989 | Japan | 219/69.15 |
| 814202 | 6/1959 | United Kingdom | 219/69.15 |
| 86/00841 | 2/1986 | WIPO | 219/69.15 |

*Primary Examiner*—Geoffrey S. Evans
*Attorney, Agent, or Firm*—Andrew C. Hess; Gerry S. Gressel

[57] ABSTRACT

An electrical discharge machine includes a chuck for holding an electrode above a workpiece. A lower guide positions a tip of the electrode above the workpiece, and mid-guide laterally supports the electrode between its opposite ends for reducing flexing therebetween.

10 Claims, 3 Drawing Sheets

FLEX RESTRAINED ELECTRICAL DISCHARGE MACHINING

BACKGROUND OF THE INVENTION

The present invention relates generally to electrical discharge machining (EDM), and, more specifically, to EDM drilling.

Electrical discharge machining is a process in which a cathodic electrode is positioned atop an electrically conducting workpiece and a liquid dielectric is channeled therebetween. Electrical current passes between the electrode and workpiece and locally erodes the workpiece for machining thereof. In a typical application, the electrode may be used for drilling a hole of any desired shape in the workpiece.

For example, many gas turbine engine components include small holes therein through which cooling air is channeled during operation. The holes are small in diameter and typically range from 10–80 mils (0.2–2.0 mm), and require a slightly smaller diameter EDM electrode.

The narrow electrodes are consumed during machining, and are therefore initially relatively long in length which typically ranges from about 12–16 inches (30–41 cm) for obtaining a useful life during drilling. Furthermore, the electrodes are typically tubular for channeling the liquid dielectric therethrough during operation. Accordingly, the hollow, slender electrodes are relatively flexible in bending along their longitudinal axes. Such flexibility is typically not desirable since it adversely affects the accuracy and repeatability of EDM drilling.

More specifically, the electrode tip must be accurately maintained at a small clearance gap of about 1 mil (0.25 mm) with the workpiece to effect suitable electrical discharge machining without experiencing an undesirable electrical short circuit therewith. Accordingly, the electrode tip is typically mounted through a lower guide which accurately maintains a side clearance around the electrode as it drills through the workpiece. And, the opposite or top end of the electrode is held in a conventional electrode holder which is effective for translating the electrode downwardly toward the workpiece during operation, and for maintaining the small clearance gap vertically therebetween. In this way, the tip guide and electrode holder accurately support both ends of the electrode for maintaining the desired gap both laterally around the electrode tip and vertically between the tip and the workpiece during the EDM operation.

However, the electrodes have a maximum length at the beginning of the drilling operation, with corresponding maximum flexibility, and are consumed during drilling which decreases their length and flexibility correspondingly.

Electrode flexibility becomes a problem due to the substantially high pressure of the dielectric channeled therethrough. Dielectric pressures up to about 50 atmospheres are conventional and produce a jet of dielectric discharge from the electrode tip against the workpiece as a hole is drilled. The electrode correspondingly experiences a reaction force which acts in compression therethrough. Since the electrode is a slender rod or column, it is subject to compressive buckling loads which can cause lateral deflection of electrode which correspondingly shortens its effective length and withdraws the electrode tip slightly away from the workpiece. In response thereto, the electrical controller which feeds the electrode toward the workpiece effects additional feed. However, the reaction flexing of the electrode due to the dielectric discharge is a periodic phenomena which causes the controller to correspondingly retract and feed the electrode at the corresponding frequency. This transient effect adversely affects the ability to maintain accurate depth control of the electrode.

A conventional solution to this problem includes the use of precision ground tubular brass electrodes. This is a relatively expensive process to impart residual stress in the ground electrodes which increases their rigidity and therefore decreases the undesirable flexing thereof during EDM drilling.

Accordingly, it is desired to improve EDM drilling for reducing electrode flexing and decreasing the cost of electrodes therefor.

BRIEF SUMMARY OF THE INVENTION

An electrical discharge machine includes a chuck for holding an electrode above a workpiece. A lower guide positions a tip of the electrode above the workpiece, and mid-guide laterally supports the electrode between its opposite ends for reducing flexing therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
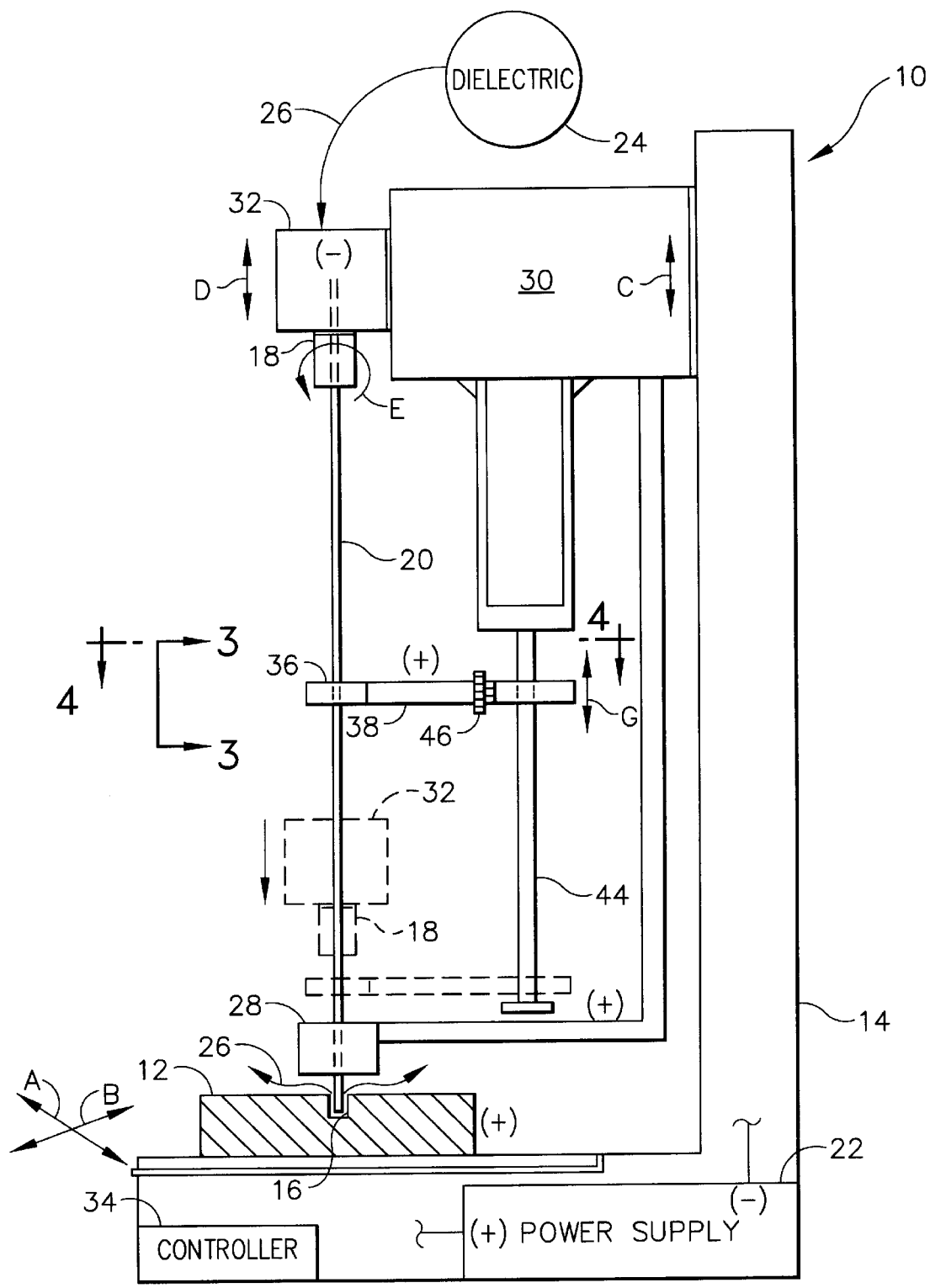
FIG. 1 is a schematic representation of an electrical discharge machine in accordance with an exemplary embodiment of the present invention.

Illustrated in FIG. 1 is a machine 10 configured for electrical discharge machining (EDM) or drilling of a workpiece 12. The workpiece 12 may have any conventional configuration, and is typically formed of an electrically conducting metal for which it is desired to drill either blind or through holes therein using EDM.

The machine includes a stationary frame 14 for supporting the workpiece 12. This may be effected using a corresponding table having two degrees of freedom or travel A, B for positioning the workpiece 12 as desired for drilling one or more holes 16 therein.

Mounted at the top of the frame 14 is an electrode holder in the form of a chuck 18 which releasably mounts an individual electrode 20 which is preferably tubular and may be formed of brass or copper, for example. The chuck 18 may be opened to insert therein a top end of the electrode 20 and then is clamped closed to suspend a tip of the electrode at an opposite lower end thereof above the workpiece 12.

An electrical DC power supply 22 is operatively joined to the workpiece to define an anode, and to the electrode 20 to define a cathode.

A dielectric supply 24 is operatively joined to the electrode 20 for channelling under pressure through a tubular internal passage thereof a liquid dielectric 26, in the form of deionized water for example. The dielectric pressure may be up to about 50 atmospheres for example.

The machine also includes a lower guide 28 mounted to the frame 14 for positioning or guiding the suspended electrode tip closely above the workpiece. The bottom of the lower guide 28 and the top of the workpiece 12 are typically separated by a small clearance of about 20–30 mils (0.51–0.76 mm) for accurately maintaining the lateral position of the electrode within a few mils.

In a preferred embodiment, a carrier head 30 is mounted atop the frame 14 for vertical translation therealong in a third direction or axis C and supports the electrode holder. The electrode holder also includes a suitable chuck drive 32 for vertically translating the chuck 18 and the electrode therein in a fourth direction or axis D. The chuck drive 32 is also effective for rotating the chuck 18 and electrode in a fifth direction or axis E which may be up to about 900 rpm for example.

Rotation of the electrode 20 during operation may be used as desired for ensuring uniform consumption of the electrode tip as it progresses through the workpiece 12. The chuck drive 32 is effective for feeding downwardly the chuck 18 and electrode therein toward the workpiece as the electrode is consumed at the tip during EDM drilling. The chuck and electrode may also be retracted or withdrawn upwardly as desired.

The electrode 20 is an elongate or slender tubular rod having a maximum length when first installed in the chuck 18, and a majority of which length is consumed as the electrode is fed during operation, with the final position of the electrode holder being illustrated in phantom line in FIG. 1.

The electrode holder including the chuck 18, and drive 32 therefor, and the lower guide 28 are suitably mounted to the carrier head 30 for vertical translation therewith. In this way, workpieces of difference size may be mounted atop the frame, with the lower guide 28 then being moved into position thereatop by movement of the carrier head 30. The electrode holder is also moved with the head 30 for initial position atop the workpiece and then receives the electrodes 20 in turn as they are used and consumed for drilling one or more holes in the workpiece. During operation, the head 30 remains stationary and the chuck drive 32 is actuated to control the feedrate of the electrode toward the workpiece.

An electrical controller 34, which may be a digitally programmable computer, is electrically joined to the head 30, the chuck drive 32, and the power supply 22 for controlling operation of the machine in a conventional manner. The machine 10 as above described is conventional in structure, function, and use for EDM drilling the hole 16 in the workpiece 12. The controller is effective for feeding the electrode 20 as required, as well as retracting the electrode when needed.

For example, in order to maintain the small clearance gap between the electrode tip and the forming hole 16 in the workpiece, the controller 34 is configured for detecting electrical short circuits between the electrode 20 and the workpiece 12. A short circuit may occur where the electrode tip touches the workpiece which then interrupts effective EDM drilling. Accordingly, actual or impending short circuits are detected by the controller which adjusts the chuck drive 32 to automatically retract the electrode trip slightly for maintaining the proper clearance with the workpiece.

A suitable basic EDM drilling machine which may be used in practicing the present invention is commercially available from the Current EDM Company, of Wayzala, Minn. However, and as indicated above, the electrode 20 is slender, and is subject to substantial reaction loading from the dielectric 26 being discharged through the tip thereof against the top of the workpiece during operation. The dielectric pressures of up to about 50 atmospheres impart substantial compression loads on the electrode which can cause undesirable lateral bending or flexing thereof when initially used and prior to the reduction in length thereof by consumption.

As shown in FIG. 1, the electrode 20 in the basic EDM machine 10 is mounted at its top end in the chuck 18 and supported in the lower guide 28 at its lower, tip end. The entire intermediate section between the opposite ends of the electrode is therefore not conventionally supported. Conventional EDM drilling must therefore initially proceed at a relatively slow rate to minimize or prevent undesirable flexing of the electrode which would effectively shorten its length and transiently vary the end gap in the forming holes 16. Also indicated above conventional electrodes are typically precision ground components for increasing their rigidity, but at significant extra cost.

In accordance with the present invention, the machine 10 is modified to also include a mid-guide 36 mounted to the frame 14 for laterally supporting or guiding the electrode intermediate its opposite ends. A mid-guide support 38 adjustably mounts the mid-guide 36 below the chuck 18 and to the frame 14 for coordinated translation with the chuck and the electrode.

Figure 2:
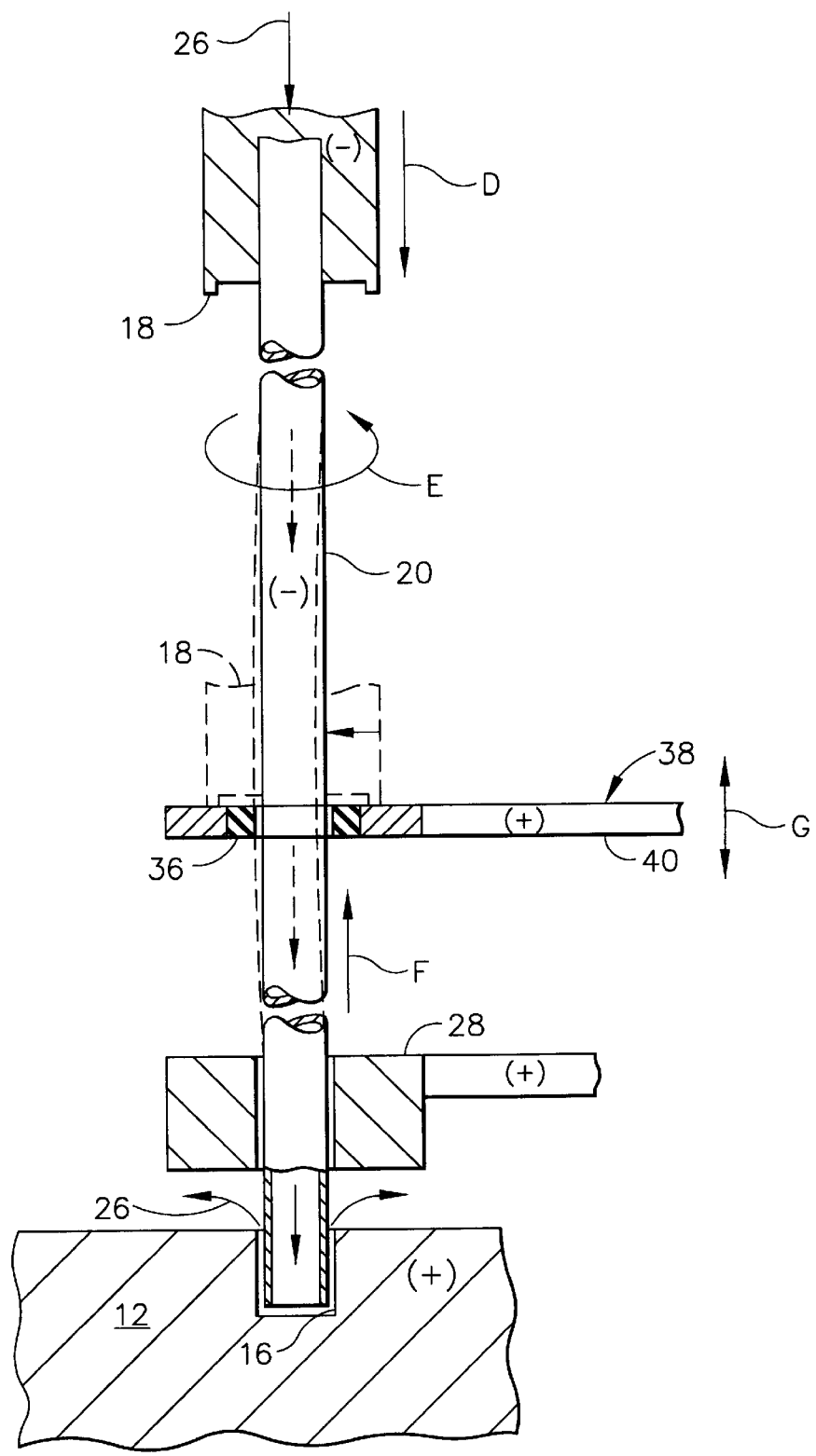
FIG. 2 is an enlarged, partly sectional view of portions of the machine illustrated in FIG. 1 including a chuck supporting an electrode above a workpiece, with a lower guide and mid-guide supporting the electrode.

Since the slender electrode 20 is subject to lateral flexing due to the reaction forces F of the high pressure dielectric 26 channeled through the electrode as shown in phantom in FIG. 2, the mid-guide restrains or limits such lateral flexing or deflection and thereby prevents undesirable changes in the vertical end gap between the electrode tip and the workpiece. As the electrode 20 is fed and consumed during operation, the mid-guide 36 is preferably manually adjusted in elevation between the chuck and the lower guide 28 for being maintained substantially mid-way therebetween and maximize the reduction in electrode flexing.

In the preferred embodiment illustrated in FIG. 1, both the chuck drive 32 and the mid-guide support 38 are mounted to the common head 30 for vertical translation therewith. In this way, the electrode holder and the two guides 28 and 36 are initially movable with the head 30 for positioning atop the workpiece 12 prior to commencing the EDM drilling operation. The head 30 then remains stationary during drilling, with the chuck drive 32 then precisely controlling feeding of the electrode for drilling the workpiece.

The improved EDM machine 10 illustrated in FIG. 1 is therefore effective for reducing flexing of the translating electrode 20 atop the workpiece 12 during EDM drilling. This is accomplished by holding or supporting the top end of the electrode 20 in the chuck 18 to suspend the electrode tip. The electrode tip is independently positioned or guided by the lower guide 28 directly above the workpiece. And, the electrode 20 is additionally guided around its intermediate location between its opposite ends to restrain lateral flexing or deflection thereat.

Individual electrodes are simply installed in the chuck 18 by firstly lowering the mid-guide 36 atop the lower guide 28, and then inserting the tip end therethrough prior to installing the top end into the chuck.

As the electrode is consumed and decreases in length during the drilling operation, the mid-guide 36 may be manually adjusted in elevation, and is preferably positioned substantially equidistantly between the electrode end-support effected at the chuck 18 and the lower guide 28. Since the mid-point between the chuck 18 and the lower guide 28 of the electrode is subject to maximum flexing or deflection, it is preferred to position the mid-guide 36 at this location to restrain or limit such flexing. This, in effect, substantially increases the structural rigidity of the electrode since the electrode is maintained substantially straight during operation and is quite rigid under compression. Since the mid-guide 36 prevents or limits the initial bending capability of the electrode, the corresponding increased flexibility therefrom is prevented at its inception, and thus substantially eliminates the flexing problem.

The mid-guide 36 illustrated generally in FIG. 1 may be effected in various manners by providing a structural restraint around the mid-length of the unsupported electrode.

Figure 3:
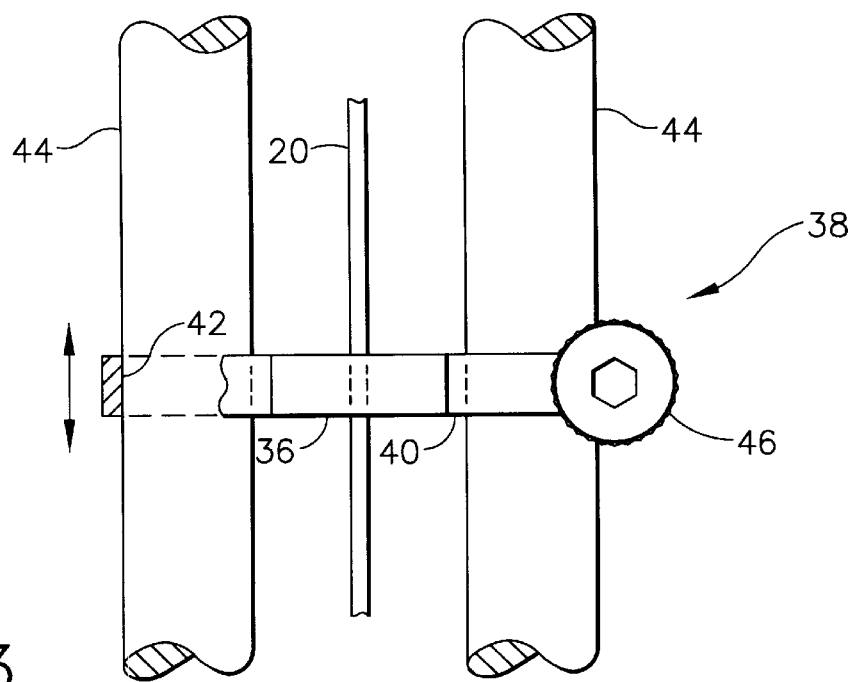
FIG. 3 is an elevational, end view of the mid-guide illustrated in FIG. 1 and taken along line 3—3.
Figure 4:
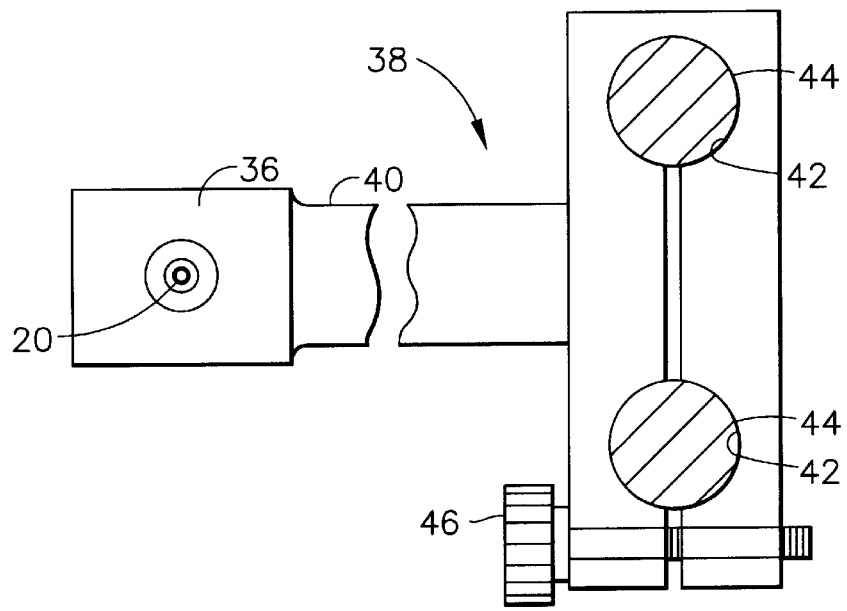
FIG. 4 is a top view of the mid-guide illustrated in FIG. 1 and taken along line 4—4.

For example, a preferred embodiment of the present invention is illustrated in more detail in FIGS. 2–4. The mid-guide support 38 may include a support beam or arm 40 which includes the mid-guide 36 at a distal end thereof, and a pair of mounting holes 42 are disposed at an opposite, proximal end of the beam 40 as best illustrated in FIG. 4. A pair of vertical support rods 44 are fixedly suspended from the head 30 as shown in FIG. 1, and extend through respective ones of the mounting holes 40 as illustrated in FIGS. 3 and 4. A locking or set screw 46 threadingly engages the support beam adjacent the holes 42 to selectively apply and release clamping force for manually adjusting the support beam in elevation G along the rods 44 around the mounting holes 42.

As shown in FIG. 4, the proximal end of the support beam 40 may include a partial slot extending through one or both of the holes 42, with the screw 46 bridging the slot for clamping together the perimeters of the holes around the corresponding rods 44 in a conventional manner. In this way, the screw 46 may be unthreaded slightly to release the clamping force on the rods 44, and then the support arm 40 is manually adjusted in elevation as required, with the screw 46 then being tightened to clamp the support beam 40 at the preferred elevation on the rods 44.

In the preferred embodiment illustrated in FIGS. 2 and 4, the mid-guide 36 is preferably an electrical insulator in the form of a bushing which laterally surrounds the electrode at the intermediate location and therefore will not effect an electrical short in the event of contact therebetween. However, the support 38 for the mid-guide 36 is preferably an electrical conductor and is electrically joined to the controller 34 in the same manner that the lower guide 28 is conventionally joined thereto.

In this way, in the event the chuck 18 inadvertently contacts the mid-guide support 38 as illustrated in phantom in FIG. 2, the electrical short created thereby will be detected by the controller 34 in a conventional manner which will then cause automatic retraction of the chuck 18 away from the mid-guide support to interrupt the short circuit. This is a safety feature in the event that the mid-guide is not properly positioned during operation and is inadvertently contacted by the feeding chuck 18.

As indicated above, the adjustable mid-guide 36 limits the lateral flexing or deflection of the electrode 20 which is most needed when it has it maximum length, and is less needed as the electrode is shortened by consumption during operation. The electrode is substantially more rigid in operation since it is maintained substantially straight. Accordingly, it is no longer necessary to manufacture suitable electrodes using the more expensive precision grinding operation. And, the electrode 20 may now be a considerably less expensive extruded electrode which does not require precision grinding.

The resulting EDM machine 10 illustrated in FIG. 1 is therefore substantially improved over its conventional counterpart by the simple introduction of the mid-guide 36, and the electrical cooperation of its support 38 with the existing controller 34 without further modifications thereof. The less expensive extruded electrode 20 may now be used without regard for excessive flexing thereof during drilling. EDM drilling times may now be substantially reduced in view of the elimination of electrode flexing. And, the reduction in electrode flexing provides better drilling depth control of blind holes not previously possible with the flexible electrodes.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An electrical discharge machine for drilling a workpiece with a tubular electrode comprising:
   a frame for supporting said workpiece;
   a chuck mounted to said frame for holding a top end of said electrode to suspend a tip at an opposite lower end thereof;
   a power supply operatively joined to said workpiece and electrode;
   a dielectric supply operatively joined to said electrode for channeling therethrough a liquid dielectric under pressure;
   a lower guide mounted to said frame for positioning said electrode tip above said workpiece; and
   a mid-guide mounted to said frame for laterally supporting said electrode intermediate said opposite ends.

2. A machine according to claim 1 further comprising a chuck drive for translating said chuck and said electrode therein toward said workpiece as said electrode is consumed at said tip during said drilling; and
   a support for adjustably mounting said mid-guide to said frame for coordinated translation with said chuck and electrode.

3. A machine according to claim 2 further comprising a carrier head mounted atop said frame for translation therealong; and
   wherein said chuck drive and said mid-guide support are mounted to said head for translation therewith.

4. A machine according to claim 3 wherein said mid-guide comprises an electrical insulator for surrounding said electrode at said intermediate location.

5. A machine according to claim 4 further comprising a controller electrically joined to said chuck drive and said mid-guide support for retracting said electrode upon electrical short between said chuck and said mid-guide support.

6. A machine according to claim 4 wherein said mid-guide support is manually adjustable in elevation below said head.

7. A machine according to claim 4 wherein said mid-guide support comprises:
   a support beam including said mid-guide at a distal end thereof, and a pair of mounting holes at an opposite proximal end thereof;
   a pair of support rods suspended from said head and extending through respective ones of said mounting holes; and a lock screw manually adjustable in said support beam to selectively clamp said beam to said rods at said mounting holes.

8. An electrical discharge machine for drilling a workpiece comprising:

a frame for supporting said workpiece;

a tubular electrode;

a chuck mounted to said frame for holding a top end of said electrode to suspend a tip at an opposite lower end thereof;

a power supply operatively joined to said workpiece and electrode;

a dielectric supply operatively joined to said electrode for channeling therethrough a liquid dielectric under pressure;

a lower guide mounted to said frame for positioning said electrode tip above said workpiece; and a mid-guide mounted to said frame for laterally supporting said electrode intermediate said opposite ends, wherein said electrode is an extruded electrode.

9. A method for reducing flexing of a translating electrode atop a workpiece in electrical discharge machining comprising:

holding a top end of said electrode to suspend a tip at an opposite lower end thereof;

guiding said electrode tip above said workpiece;

guiding said electrode intermediate said opposite ends to restrain lateral flexing thereat; and adjusting said intermediate guiding as said electrode is consumed and decreases in length during electrical discharge machining.

10. A method according to claim 9 wherein said intermediate guiding of said electrode is effected substantially equidistantly between said top holding and tip guiding thereof.

* * * * *